United States Patent [19]

Brown

[11] 4,030,017

[45] June 14, 1977

[54] CONTROLLED REACTANCE REGULATOR CIRCUIT

[75] Inventor: Harold J. Brown, Lorain, Ohio

[73] Assignee: Lorain Products Corporation, Lorain, Ohio

[22] Filed: Jan. 6, 1976

[21] Appl. No.: 646,973

Related U.S. Application Data

[63] Continuation-in-part of Ser. No. 546,554, Feb. 3, 1975, Pat. No. 3,983,469.

[52] U.S. Cl. .............................. 321/9 R; 321/18; 321/47; 323/8; 323/17; 323/60
[51] Int. Cl.[2] .................. H02M 7/155; G05F 1/30
[58] Field of Search ............... 321/9 R, 18, 26, 47; 323/6, 7, 8, 17, 22 SC, 24, 34, 38, 45, 48, 60

[56] References Cited

UNITED STATES PATENTS

| | | |
|---|---|---|
| 3,065,399 | 11/1962 | McNamee ........................... 321/18 |
| 3,745,437 | 7/1973 | Brown ............................... 323/8 X |
| 3,889,176 | 6/1975 | Randall ................................ 323/8 |

Primary Examiner—A. D. Pellinen
Attorney, Agent, or Firm—Edward C. Jason

[57] ABSTRACT

A circuit for providing a regulated a-c or d-c output voltage from an unregulated a-c input voltage. A series inductance is connected between the regulator input and the regulator output to support the difference in voltage between the unregulated a-c input voltage and the regulated a-c or d-c output voltage. A controllable shunt reactance is connected to the source of input voltage, through the series inductance, to vary the current through and the voltage across the series inductance. Control circuitry controls the magnitude and the capacitive/inductive character of the current which the shunt reactance draws through the line inductance, as required, to establish and maintain the regulated output voltage at the desired output current.

36 Claims, 11 Drawing Figures

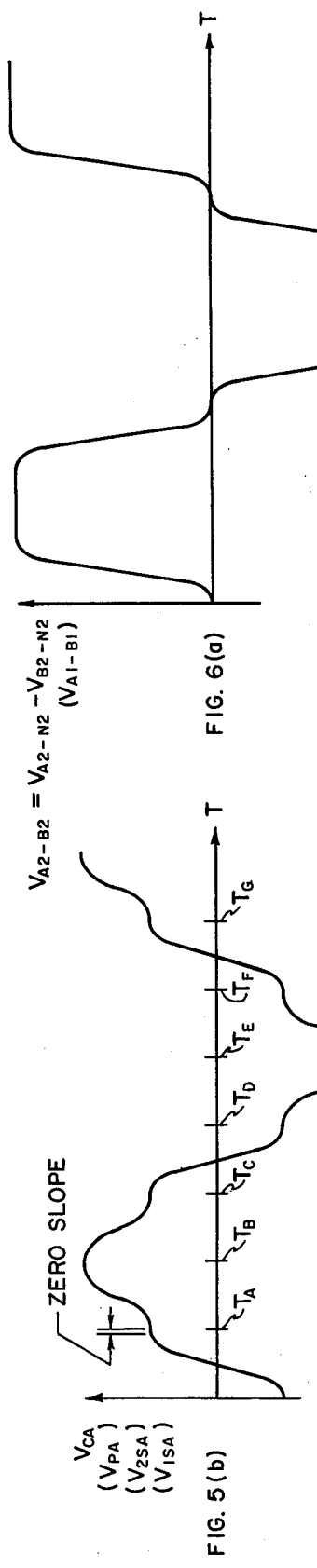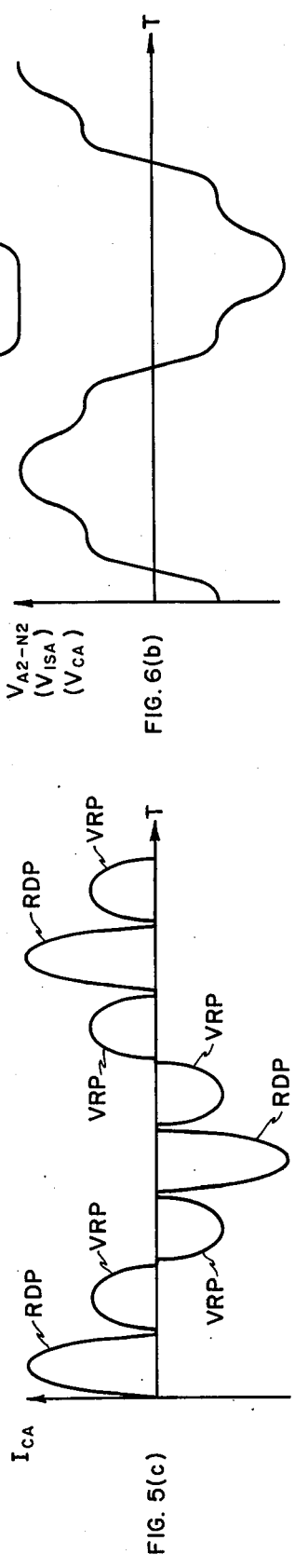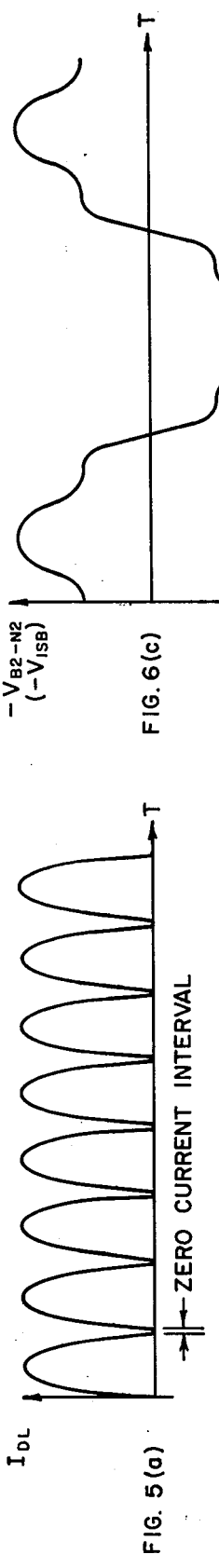

CONTROLLED REACTANCE REGULATOR CIRCUIT

CROSS REFERENCES TO RELATED APPLICATIONS

This application is a continuation-in-part of copending application Ser. No. 546,554, filed Feb. 3, 1975, now U.S. Pat. No. 3,983,469.

BACKGROUND OF THE INVENTION

The present invention relates to voltage regulating circuits and is directed more particularly to voltage regulating circuits wherein a controllable shunt reactance varies the voltage induced across an inductor, as required, to maintain that induced voltage equal to the difference in voltage between an unregulated input voltage and a regulated output voltage.

Voltage regulators utilizing series-connected inductors in association with shunt-connected capacitors have long been known and used for providing a substantially constant output voltage form an unregulated a-c input voltage. Early forms of such regulators were known as ferroresonant regulators and utilized series-connected inductors together with shunt-connected networks which included capacitors and saturable core magnetic units. Such concepts are shown, for example, in U.S. Pat. No. 2,143,745 granted to J. G. Sola on Jan. 10, 1939, and U.S. Pat. No. 2,377,152 granted in the name of H. M. Huge on May 29, 1945. Because of the excessive weight and audible noise associated with these saturable core magnetic units and because of the difficulty of obtaining an output voltage waveform of satisfactory harmonic content, many attempts have been made to improve upon ferroresonant type voltage regulators.

One attempt to improve upon ferroresonant voltage regulators has involved the substitution of a plurality of series-connected, saturable core magnetic units for each single saturable core magnetic unit thereof. Such substitutions are shown, for example, in U.S. Pat. No. 3,092,768 granted in the name of A. Kusko on June 4, 1963 and U.S. Pat. No. 3,139,577 granted in the name of D. Krezek on June 30, 1964. In circuits of the latter type, the series-connected magnetic units saturate in a predetermined sequence to generate a waveform which is approximately sinusoidal. While circuitry of this type can provide a waveform of satisfactory harmonic content, it increases the complexity and cost of the regulator without eliminating the problems of excessive weight and audible noise.

Another attempt to improve ferroresonant voltage regulators has involved the substitution of gate controlled switching devices and linear inductances for each saturable core magnetic unit. Such substitutions are shown, for example, in U.S. Pat. No. 3,076,924 granted in the name of E. W. Manteuffel on Feb. 5, 1963. In such circuits, the linear inductance simulated the saturated impedance of a saturable core magnetic unit and the gate controlled switching devices simulated the off-on conducting characteristic thereof. While the utilization of such solid-state circuitry did reduce the weight and noise associated with ferroresonant voltage regulators, it did not solve the problem of reducing the high harmonic content of its output voltage. In addition, such solid-state circuitry did not lend itself to use in true three phase voltage regulators. As a result, polyphase forms of such solid-state regulator circuits were produced by the uneconomical expedient of coupling together a plurality of single-phase solid-state regulator circuits.

A still more recent attempt to solve the above-described problem is described in U.S. Pat. No. 3,745,437 granted in my name on July 10, 1973. The circuitry shown and described in that patent will hereinafter be referred to as the circuitry of my earlier patent. While the circuitry of my earlier patent solves the problem of providing a true polyphase regulator circuit having an output voltage of acceptable harmonic content, it does not satisfactorily deal with certain practical problems which prevent that circuitry from being economical. In the circuitry of my earlier patent, it is, for example, desirable to utilize relatively expensive circuit components having special operating characteristics. Thyristors which have relatively high peak and rms current ratings are typically necessary. High performance core materials and low inductance capacitors are also typically necessary. Thus, while the circuitry of my earlier patent is a useful and operative structure, it has certain practical deficiencies. An additional disadvantage of the circuitry described in my earlier patent is that it produces substantial amounts of audible noise. This audible noise, in turn, imposes further practical limitations on the usefulness of the circuitry since the magnetic units are preferably potted and the circuit as a whole is preferably surrounded by sound absorbing materials.

In accordance with the present invention, there is provided polyphase regulating circuitry which exhibits all of the numerous advantages of the regulating scheme described in my earlier patent, which is realizable with magnetic units utilizing ordinary core materials and ordinary winding configurations, and which utilizes ordinary capacitors and ordinary semiconductor devices. In addition, the regulating circuitry of the present invention eliminates the problem of excessive audible noise and produces an output waveform of harmonic content which is even lower than that produced by the circuit of my earlier patent. Thus, the circuit of the present invention is a significant improvement over the voltage regulator circuit of my earlier patent.

SUMMARY OF THE INVENTION

It is an object of the invention to provide an improved voltage regulator circuit of the type wherein the output voltage is determined by the effect of a controllable shunt reactance on an inductor connected between the regulator input and the regulator output.

An additional object of the invention is to provide an improved voltage regulator circuit of the above type in which the waveform of the voltage across the shunt reactance is determined by a programmed redistribution of charge amount a plurality of capacitors.

Yet another object of the invention is to provide an improved voltage regulator circuit of the above type in which the shunt reactance includes plurality of capacitors connected together so as to form a closed loop or mesh, so arranged that an externally triggered change in the level of charge on any capacitor is reflected by a voltage reaction or change in the level of charges on the other capacitors in the mesh.

It is another object of the invention to provide an improved voltage regulator circuit of the above character wherein the mesh-connected capacitors are associated with a discharge inductor for controllably reversing the polarity of the charge on selected ones of the capacitors.

Still another object of the invention is to provide an improved voltage regulator circuit of the last-described type in which the ratio of the capacitive reactance of any capacitor (at the a-c input frequency) is from fifteen to one hundred and fifty times greater than the inductive reactance of the discharge inductor (at the input frequency).

Another object of the invention is to provide an improved voltage regulator circuit which need not utilize magnetic devices, capacitors or semiconductor devices having special operating characteristics.

Still another object of the invention is to provide a voltage regulator circuit of the above type wherein the voltage across the controllable shunt reactance has an improved waveform of lower harmonic content.

Another object of the invention is to provide a regulator circuit of the above type in which each redistribution of charge amount the capacitors is accomplished as a result of the timed initiation of a resonant current pulse, each resonant current pulse having a frequency of from three to ten times the frequency of the unregulated a-c input voltage.

An additional object of the invention is to provide an improved voltage regulator circuit including a series regulating network comprising an inductor connected between the regulator input and the regulator output and including a shunt regulating network comprising a plurality of mesh-connected capacitors, a discharge inductor, and a phase-controlled switching network, wherein phase control of the switching network can cause the net impedance of the shunt switching network to vary from capacitive to inductive.

It is another object of the invention to provide an improved voltage regulator circuit of the last described type wherein the phase-controlled switching network has a-c inputs connected to the capacitors and a d-c output connected to the discharge inductor.

Yet another object of the invention is to provide an improved polyphase voltage regulator circuit including a set of primary windings connected to the a-c input, a first set of secondary windings connected to the regulator output, and a second set of secondary windings connected to the controllable shunt reactance.

It is another object of the invention to provide a polyphase voltage regulator circuit of the above character wherein differences in the configurations of the windings are utilized to reduce the ripple content of the regulated d-c output voltage.

DESCRIPTION OF THE PREFERRED EMBODIMENT

Figure 1:
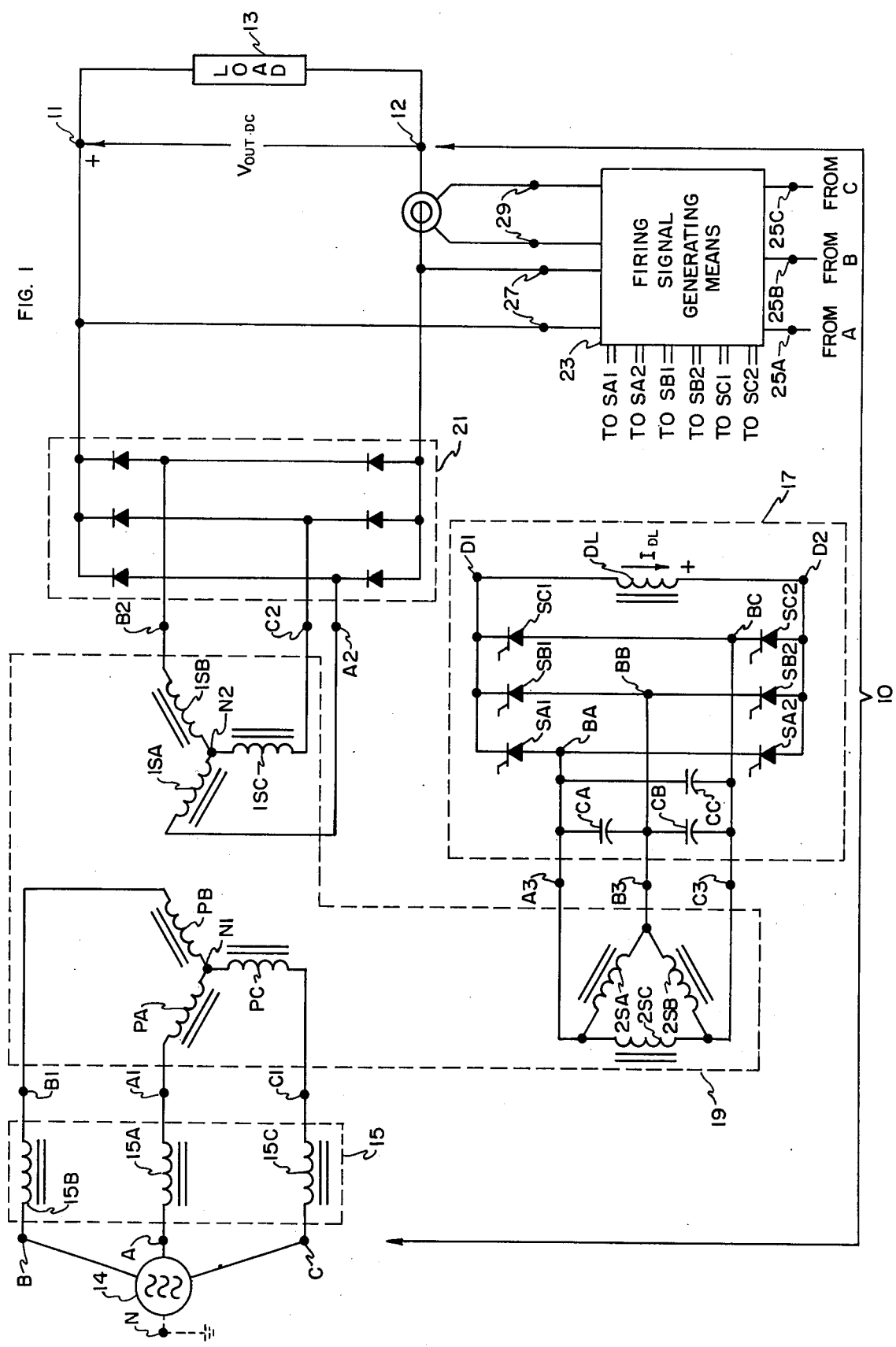
FIG. 1 is a schematic diagram of a preferred embodiment of the circuit of the invention.

Referring to FIG. 1, there is shown a voltage regulating circuit 10 for supplying a regulated d-c voltage to the terminals 11 and 12 of a d-c load 13 from the unregulated a-c voltage which a polyphase source 14 establishes at a-c input terminals A, B and C. Regulating circuit 10 includes a series regulating network which here takes the form of a line inductance 15 for supporting the difference between the unregulated a-c input voltages at terminals A, B and C and the regulated d-c output voltage at terminals 11 and 12. Line inductance 15 may comprise three separate substantially equal inductors connected between terminal pairs B-B1, A-A1 and C-C1 or, alternatively, may consist of three coupled windings 15B, 15A and 15C which are located on a single magnetic core. It will be understood that the function of inductance 15 may also be served by suitable magnetic shunts located in suitable three phase transformer such as transformer 19, the equivalence of a leakage reactance transformer to an inductor in series with a non-leakage reactance transformer being old and well-known.

Regulating circuit 10 also includes a controllable shunt reactance network 17 for inducing across line inductance 15 voltages equal to the difference between the available unregulated a-c input voltages and the regulated output voltage. As will be described more fully presently, reactance network 17 serves as a shunt regulating network which controls the voltage across inductance 15 by drawing therethrough, from source 14, a reactive current of controllable magnitude and type. Thus, series regulating network 15 and shunt regulating network 17 comprise cooperating portions of the power handling part of the circuit of the invention.

Regulating circuit 10 also includes a suitable three-phase recifying network 21 which converts the a-c voltage at terminals B2, A2 and C2 to a d-c voltage at output terminals 11 and 12. It will be understood that if only an a-c output voltage is required, the desired output voltage and current may be drawn from terminals B2, A2 and C2. In the latter event, the diodes of network 21 will be used for sensing purposes only and the current rating of these diodes may be greatly reduced since they conduct no load current. Alternatively, if both an a-c and d-c output voltages are required, d-c output 11-12 and a-c ouput B2, A2 and C2 may be used simultaneously.

Also forming an important part of regulating circuit 10 is a polyphase transformer 19 which, in the present preferred embodiment, includes a set of three star or Y-connected primary windings PA, PB and PC, a first set of three star or Y-connected secondary windings 1SA, 1SB and 1SC and a second set of three mesh or delta-connected windings 2SA, 2SB and 2SC. Preferably, transformer 19 should be constructed so that the three windings identified with the letter A are located on one leg of the transformer core and so that the three windings identified with the letters B and C are on respective second and third legs of the core. In the preferred embodiment, each of these three sets of windings is electrically isolated from each other set. It is, however, possible to utilize various combinations of windings in an auto-transformer configuration.

Transformer 19 serves a variety of functions. Firstly, it allows the regulated output voltage to be higher or lower than the polyphase a-c input voltage, depending upon the turns ratios between primary windings PA, PB and PC and secondary windings 1SA, 1SB and 1SC. Secondly, transformer 19 allows the voltages at terminals A3, B3 and C3 of shunt regulating network 17 to be higher or lower than the a-c input voltages, depending upon the turns ratios between primary windings PA, PB and PC and secondary windings 2SA, 2SB and 2SC. Thirdly, transformer 19 serves a waveshaping function, i.e., causes the waveforms of the a-c voltages at terminals B2, A2 and C2 to be different from the waveforms of the voltages which network 17 applies to secondary windings 2SA, 2SB and 2SC. This waveshaping is utilized to reduce the ripple content of the d-c output voltage upon rectification by network 21.

The schematic diagram of the circuitry shown in FIG. 1 is similar to the schematic diagram of the circuitry shown and described in my earlier patent. For example, both the circuit of FIG. 1 and the circuit of my earlier patent include shunt reactance networks having a similar schematic representation. In addition, both the circuitry of FIG. 1 and the circuitry shown in my earlier patent include series-connected line inductances and three phase rectifying networks. The circuit elements which are utilized in constructing the regulator circuitry shown in FIG. 1 and that shown in my earlier patent are, however, quite different. More particularly, the circuitry of the present invention is preferably constructed with magnetic units including only ordinary core materials and ordinary winding configurations, with capacitors which need not have low distributed inductances and with semiconductor devices which have only ordinary current ratings. The circuitry of my earlier patent, however, utilizes magnetic units, capacitors and semiconductor devices which have special characteristics and which are substantially more expensive than those utilized in the circuit of FIG. 1. In addition, the circuitry of the present invention is governed by different time and impedance magnitude relationships and operates within a range of frequencies which excludes operation in the manner described in my earlier patent. Thus, the circuitry of the present invention and that shown in my earlier patent are less similar than a visual comparison of their schematic diagrams would indicate.

In spite of the fact that the circuit of FIG. 1 costs substantially less than that of my earlier patent and utilizes time and impedance magnitude relationships which contravene the time relationships described therein, I have found that it has regulating properties which are equal to the regulating properties of the circuitry decribed in my earlier patent. In addition, the circuitry of the present invention produces substantially less audible noise and mechanical vibration than the circuitry of my earlier patent. Finally, the circuitry of FIG. 1 produces waveforms of lower harmonic content and, consequently, has lower harmonic power dissipation. Thus, the circuitry shown and described herein is an improvement over the circuitry of my earlier patent.

As shown in FIG. 1, the terminals A3, B3 and C3 of shunt reactance 17 are coupled to the load side of inductor 15, i.e., to terminals A1, B1 and C1, through transformer 19. In addition, source 14 is coupled to terminals A1, B1 and C1 through inductor 15. Finally, terminals A1, B1 and C1 are coupled to terminals A2, B2 and C2, through transformer 19. As a result of these connections, the instantaneous voltages at terminals A2, B2 and C2 are equal to the algebraic sums of the instantaneous voltages at input terminals A, B, and C and the instantaneous voltages appearing across inductor windings 15A, 15B and 15C, respectively, multiplied by the turns ratios between primary windings PA, PB and PC and secondary windings 1SA, 1SB and 1SC.

An additional result is that the voltages across inductor windings 15A, 15B and 15C are dependent upon the magnitudes and types of the reactive currents which capacitors CA, CB and CC and inductor DL draw from source 14, through inductance 15, as will now be explained.

In the preferred embodiment, the line-frequency reactance of any of capacitors CA, CB and CC is chosen to be substantially larger than the line-frequency reactance of inductor DL and to be approximately equal to the line-frequency reactance of inductance 15. As a result, when the switching of thyristors SA1-SC2 occurs relatively late in the voltage across network 17, the reactance of network 17 is capacitive, causing currents which lead the input voltages to be drawn through inductance 15. These leading currents induce across inductance 15 positive voltages i.e., voltages which add to the input voltages or pull the input voltages up to the desired voltage levels at terminals A1, B1 and C1.

When the switching of thyristors SA1-SC2 occurs relatively earlier in the voltage across network 17, inductor DL effectively cancels a relatively larger part of the capacitive currents drawn by capacitors CA, CB and CC, causing network 17 to draw less capacitive current through inductance 15. This reduction in capacitive current causes lesser but still positive voltages to appear across inductance 15. As a result, the "pull-up" effect which the voltages across inductance 15 exert on the input voltages is not as strong.

When the switching of thyristors SA1-SA2 occurs relatively early in the voltage across network 17, inductor DL effectively swamps the capacitive currents drawn by capacitors CA, CB and CC, causing network 17 to draw inductive currents through inductance 15. This change in the sign of the reactive current causes negative voltages to be induced across inductance 15, i.e., voltages which subtract from the input voltages or pull the input voltages down to the desired voltages at terminals A1, B1 and C1. While the preferred embodiment of the present invention contemplates operation in both the above described pull-up mode and the above described pull-down mode, it is not essential that both modes be used. In my copending application Ser. No. 546,554, now Pat. No. 3,983,469, of which the present application is a continuation-in-part, for example, only the pull-up mode is used. As a result, in the latter circuit voltage regulation is accomplished by changing the amount by which the voltages across inductance 15 add to the input voltages, no condition in which the voltages across inductance 15 subtract from the input voltages being present.

In view of the foregoing, it will be seen that control of the switching times of thyristors SA1-SC2 can cause the voltages across inductance 15 to either add to or subtract from the a-c input voltages. In other words, control of the switching times of thyristors SA1-SC2 can cause the voltages at terminals A1, B1 and C1 to be either greater or less than the voltages at input terminals A, B and C. This view of the operation of the regulating circuitry of the preferred embodiment is particularly useful in visualizing how the circuitry regulates in the presence of input voltage variations.

On the other hand, network 17 may be visualized as a virtual three-phase voltage generator the voltages of which lag the a-c input voltages by a variable phase angle. From this viewpoint, the voltages between terminals A3, B3 and C3 may be visualized as the output voltages of the virtual generator and voltage regulation may be visualized as the result of the action of the actual source 14 and the phase-shifted virtual source 17 on inductor 15. In this view, virtual source 17 draws its operative energy from source 14 by way of the in-phase component of the current which network 17 draws from source 14, and the voltages which must be induced across inductor 15 to support the difference between the unregulated voltages at terminals A, B and C and the regulated voltages at terminals A1, B1 and C1 are induced by the flow of reactive currents between sources 14 and 17. This view is particularly useful in understanding how variations in the power supplied to the load result from changes in the angle by which the voltages of virtual source 17 lag the voltages of actual source 14. A detailed description of this power control mechanism may be found in U.S. Pat. No. 3,576,443 granted in my name on Apr. 27, 1971.

In practice, it makes no significant difference whether the regulator circuitry of the invention is viewed as utilizing a controllable shunt reactance or as utilizing a virtual voltage generator. Accordingly, for purposes of this decription, terminology stemming from either or both views will be used, depending upon which terminology most conveniently decribes the subject matter then under discussion.

To the end that shunt reactance network 17 may draw from source 14, through inductor 15, reactive currents which cause the difference between the a-c input voltages and the regulated output voltae to appear across the windings of the line inductor 15, or, alternatively, to the end that shunt reactance network 17 may vary the phase angle between the voltages which it applies to inductor 15, through transformer 19, and the input voltages at input terminals, B, A and C, network 17 includes a pluarlity of mesh-connected capacitors CA, CB and CC. In the present embodiment, the mesh connection includes a three element loop or delta of capacitors. Network 17 also includes a plurality of thyristor switches SA1, SB1, SC1, SA2, SB2 and SC2 which are connected to one another as a phase-controlled switching network which here takes the form of a polyphase bridge network having polyphase input terminals BA, BB and BC and having d-c output terminals D1 and D2 connected across a suitable discharge inductor DL. In addition to controlling the magnitude and the reactive character of the currents which network 17 draws from source 14, thyristors SA1 through SC2 provide a rectifying action and cause the current flow through discharge inductor DL to be unidirectional.

In controlling the circuitry of FIG. 1 in accordance with the principles of the present invention, thyristors SA1 through SC2 are fired, two at a time, in a predetermined, recurring sequence by firing signals from a suitable firing signal generating network 23. As will be described more fully presently, varying the phase angle between these firing signals and the a-c input voltages at terminals A, B and C can vary both the magnitudes and the capacitive or inductive character of the reactive currents which capacitors CA, CB and CC and inductor DL draw from source 14, through inductor 15, and thereby vary the voltages at terminals A1, B1 and C1. For convenience, this angle will hereinafter be referred to as the power or control angle. In addition to varying the magnitude of reactive current flow, varying the control angle can also vary the power which source 14 can furnish to load 13, through inductor 15. In accordance with the present invention, the control angle is varied in accordance with the desired output voltage so that the output voltage has a constant value over a wide range of input voltages and output power levels.

In the present embodiment, the firing signals for thyristors SA1 through SC2 are generated by a suitable firing signal generating network 23. Preferably, network 23 has inputs 25a, 25b and 25c which are connected to input terminals A, B and C to allow the phase position of the input voltages to be determined and an input 27 which is connected to the regulator output to allow the sensing of output voltage variations. An input 29 may also be connected to the regulator output to sense the regulator output currents for current limiting purposes. While any feedback control network which fires thyristors SA1 through SC2 at the times necessary to maintain the output voltage at the desired value may be utilized, the preferred form of firing signal generating means 23, is as shown in my copending U.S. patent application, serial number 514,849, filed Oct. 15, 1974, now issued as U.S. Pat. No. 3,922,594, dated Nov. 25, 1975, entitled "Control System for Phase Displacement Regulator Circuits", the disclosure of which is hereby expressly incorporated herein by reference.

As previously described, it is desirable that the circuit of FIG. 1 produce a d-c output voltage having a relatively low ripple content and/or one or more a-c output voltages. In addition, it is desirable that the circuit of FIG. 1 not require the utilization of components having special operating characteristics such as relatively high peak and rms current ratings. In accordance with the present invention, these objectives are accomplished simultaneously.

One feature which allows the simultaneous result is the selection of values for capacitors CA, CB and CC and inductor DL such that the periodic firing of thyristors SA1 through SC2 results in the relatively slow periodic redistribution of charge among capacitors CA, CB and CC in a series of discrete resonant discharge and recharge or charge redistribution events. Each of these redistribution events is characterized by the flow of a pulse of current having a form which approximates that of the positive half of a sinusoid and having a frequency determined by any of capacitors CA, CB or CC and inductor DL. In order to facilitate reference to the preferred relationship which the a-c input frequency bears to the frequency fixed by capacitors CA, CB or CC and inductor DL, the latter frequency will hereinafter be referred to as the "resonant discharge frequency" or "discharge pulse frequency".

Another cooperating feature which allows the above two objectives to be achieved simultaneously is the proper selection of winding configurations for transformer 19. Particularly when a d-c output is utilized, the selection of transformer winding configurations can result in transformer 19 performing a wave-shaping action which causes the voltages at terminals A2, B2 and C2 to have waveforms which produce negligible ripple upon rectification by network 21, as will be seen later in connection with FIGS. 6 and 7. This selection of transformer winding configurations can also be of some importance if only a-c output voltages are desired, but in that event, the waveshaping action of transformer 19 is less important.

Figure 2:
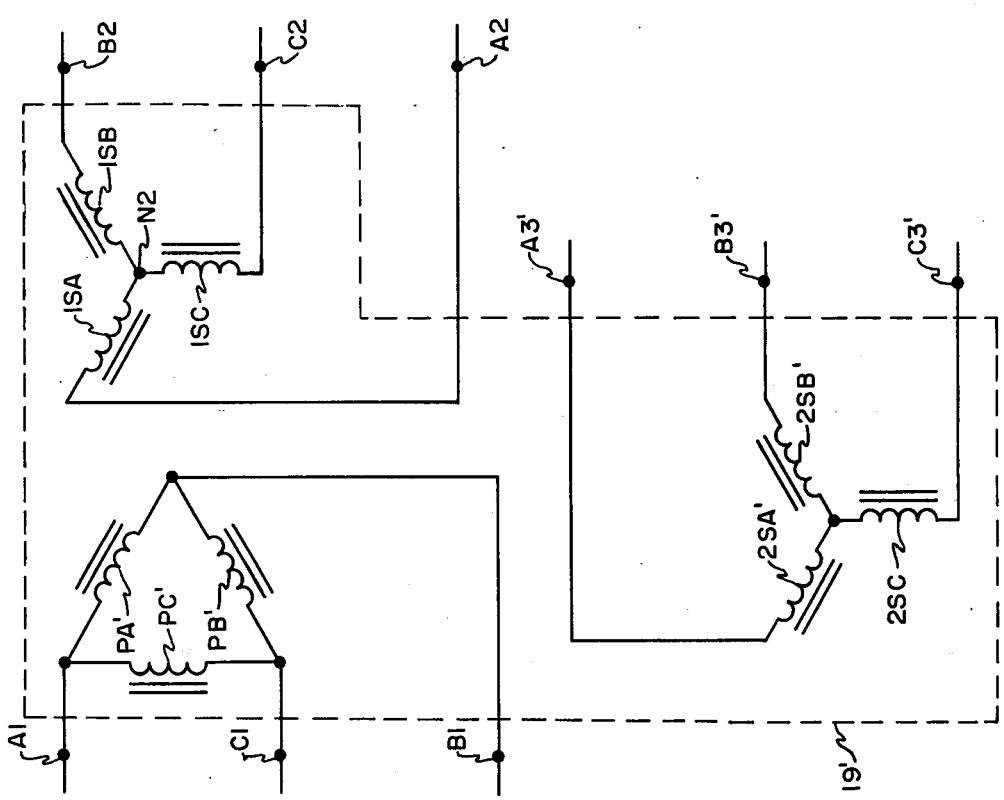
FIG. 2 is a schematic diagram of an alternative embodiment of a portion of the circuit of FIG. 1.

Within the above-described class of circuits, I have found that the most effective circuit configuration is one which utilizes the transformer configuration shown in FIG. 1, i.e., Y-connected primary and first secondary windings and delta-connected second secondary windings. It will be understood, however, that advantageous but distinctly less desirable transformer configurations may be utilized, for example, the transformer configuration shown in FIG. 2.

CIRCUIT WAVESHAPES

Figure 4:
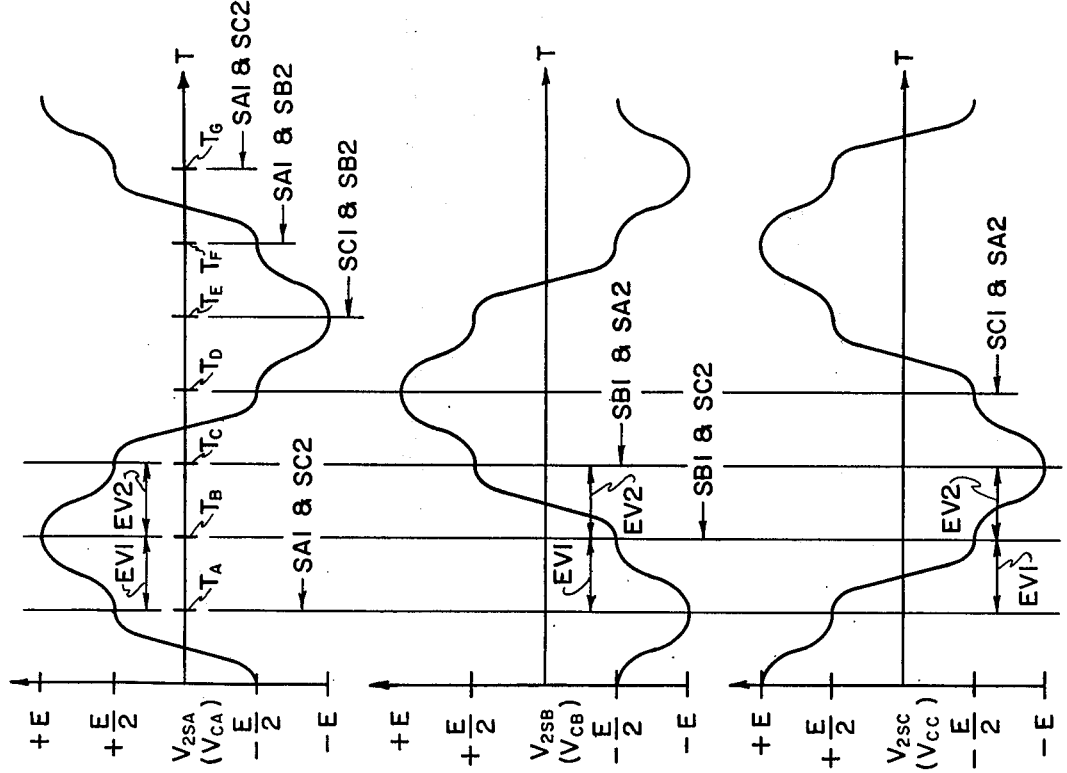

Referring to FIG. 4, there are shown the waveforms of the voltages across capacitors CA, CB and CC and, therefore, across secondary windings 2SA, 2SB and 2SC when the resonant discharge frequency is slightly greater than three times the frequency of the voltages at inputs B, A and C. As will be described more fully later, the waveforms of the voltages shown in FIG. 4 are affected by the magnitude of the input voltage and the output power, but these effects are ordinarily not extreme for the input voltage and output power ranges normally encountered in regulator circuit design.

Referring to $V_{2SC}$, the voltage across secondary winding 2SC, it will be seen that between times $T_A$-$T_B$, voltage $V_{2SC}$ reverses from $+E/2$ to $-E/2$, that voltage $V_{2SB}$ across secondary winding 2SB decreases from $-E$ to $-E/2$ and that voltage $V_{2SA}$ across secondary winding 2SA increases from $+E/2$ to $+E$. All three of these changes in voltage comprise a charge redistribution event EV1 and result from the turn-on of thyristors SA1 and SC2 at time $T_A$ and the turn-off of these same thyristors just prior to time $T_B$. The reversal of voltage $V_{2SC}$ results from the resonant discharging and recharging of capacitor CC through the path including thyristor SA1, inductor DL and thyristor SC2. The changes in voltages $V_{2SA}$ and $V_{2SB}$ occur as a voltage reaction to reversal in the voltage across capacitor CC, since the sum of the voltages across mesh-connected capacitors CA, CB and CC must be equal to zero.

Similarly, between times $T_B$ and $T_C$, the voltage $V_{2SB}$ across secondary winding 2SB reverses from $-E/2$ to $+E/2$. During the same period of time, $V_{2SA}$ and $V_{2SC}$, the voltages across secondary windings 2SA and 2SC change by $E/2$. All three of these changes in voltage comprise a redistribution event EV2 and result from the turn-on of thyristors SB1 and SC2 at time $T_B$ and the turn-off of these same thyristors just prior to time $T_C$. The reversal of voltage $V_{2SB}$ results from the resonant discharging and recharging of capacitor CB through the path including thyristor SB1, inductor DL, and thyristor SC2. The changes in voltages $V_{2SA}$ and $V_{2SC}$ occur as a voltage reaction to the reversal in the voltage across capacitor CB, since the sum of the voltages across mesh-connected capacitors CA, CB and CC must be equal to zero.

It will be understood that during time intervals $T_C$-$T_D$, $T_D$-$T_E$, $T_E$-$T_F$ and $T_F$-$T_G$, additional charge redistribution events EV3, EV4, EV5 and EV6 occur and that following charge redistribution event EV6, the voltages shown in FIG. 4 will once again be at the values which they had at time $T_A$. The sequence of thyristor firings which give rise to the voltage waveforms shown in FIG. 4 are shown in FIG. 4 together with arrows indicating the times at which those thyristors are fired. Thus, six charge redistribution events are initiated by the firing of six parts of thyristors to establish one complete cycle of the voltages shown in FIG. 4. In the event that the number of mesh-connected capacitors is increased to, for example, six (all capacitors being connected in a closed loop), it will be understood that the number of charge redistribution events and the number of thyristor firings per cycle should be increased in the same proportion. This modification should also be accompanied by an increase in the resonant discharge frequency which is sufficient to allow the number of resonant discharge pulses to be increased to twelve for each full cycle of the input voltage.

In the preferred embodiment of the invention shown in FIGS. 1 and 4, the discharge pulse frequency is slightly greater than three times the frequency of the a-c input voltage. As a result, under the conditions which exist when the waveforms shown in FIG. 4 are produced, each charge redistribution event such as EV1 begins and ends in slightly less than 60° of the input voltage. During the time between the end of one redistribution event and the beginning of the next redistribution event, e.g., between the time when thyristors SA1 and SC2 turn off at the end of EV1 and the time that thyristors SB1 and SC2 turn on at the beginning of EV2, the current inductor DL is equal to zero since thyristors SA1 through SC2 are all non-conducting. These zero current intervals are illustrated in FIG. 5a wherein $I_{DL}$, the current through inductor DL, is plotted as a function of time.

Referring to FIGS. 5b and 5c there are shown $V_{CA}$, the voltage across capacitor CA, and $I_{CA}$, the current through capacitor CA, and their relationship to the discharge current which $V_{CA}$ establishes through inductor DL. In comparing waveforms $V_{CA}$ an $I_{CA}$, it is apparent that each change in voltage $V_{CA}$ is accompanied by a pulse of current therethrough. The larger of these pulses are labeled RDP to indicate that they flow when capacitor CA resonantly discharges through inductor DL. The smaller of these pulses are labeled VRP to indicate that they flow as a result of a voltage reaction in capacitor CA to the resonant discharge of one of the other capacitors. Under a given set of input/output conditions, the current pulses through inductor DL, however, are all equal and all flow as a result of the resonant discharge of one of capacitors CA, CB or CC. Thus, when the discharge frequency is slightly greater than three times the a-c input frequency, the current $I_{DL}$ and each capacitor current comprises a series of discrete pulses of current, one set of such pulses being present for each charge redistribution event.

In practicing the invention, the resonant discharge frequency may be as high as ten times the a-c input frequency, without incurring the disadvantages of my earlier circuit. These higher frequencies, however, increase the harmonic content of the waveforms across transformer 19 without any compensating improvement in the operative characteristics of the circuit of FIG. 1 and are, consequently, less desirable than discharge frequencies within the preferred frequency range of from three to six times the a-c input frequency.

It will be understood that when the resonant discharge frequency is ten times the frequency of the input voltage, each discharge pulse will occupy a maximum of 18° of the input voltage. Similarly, when the resonant discharge frequency is three times the frequency of the input voltage, each discharge pulse will occupy a maximum of 60° of the input voltage. The word "maximum" is used here to indicate that, under different input/output conditions, each of the above current pulses may occupy less than the entire angular interval just mentioned. Under such circumstances the peak amplitude of the pulses is reduced, but their shape is substantially unchanged. Thus, the preferred relationship of the discharge frequency to the input frequency may be expressed by stating that the discharge pulses have maximum durations of from 18° to 60° of the input voltage.

On the other hand, the resonant discharge frequency may be lower than three times the frequency of the a-c input voltage. As these lower pulse frequencies are selected, however, each resonant discharge pulse may occupy moe than 60° of the input voltage. As a result, the current through discharge inductor DL may become continuous, i.e., may not fall to zero, and the zero-sloped portions of the capacitor voltages may disappear entirely. While operation within this range of discharge frequencies does not prevent the utilization of the circuit of FIG. 1 as a voltage regulator, it causes the circuitry to exhibit a dynamic response which is significantly slower than that provided when the discharge frequency is within the preferred frequency range of from three to six times the frequency of the a-c input voltage.

In view of the foregoing, it will be seen that while the circuitry of FIG. 1 may be operated with resonant discharge frequencies which are less than three times or more than ten times the a-c input voltage frequency, the circuitry of the invention contemplates operation at resonant discharge frequencies within those limits and, in the preferred form of the invention, contemplates operation at resonant discharge frequencies which are three to six times the a-c input voltage frequency.

As previously described, it is desirable that the rectification of the regulated a-c voltage at terminals B2, A2 and C2 provide a d-c output voltage which has relatively low ripple content. This low ripple content is desirable not only because it allows the regulator circuitry of the invention to be constructed without incurring the expense of heavy output filtering, but also because the absence of heavy output filtering allows the voltage regulating circuitry to have a dynamic response which is quite rapid, e.g., on the order of 20 milliseconds. In accordance with the present invention, the need for heavy output voltage filtering is eliminated as a result of the combined effect of the above-described frequency relationship and the connection of first secondary windings 1SA, 1SB and 1SC in a Y-configuration.

Figure 7:
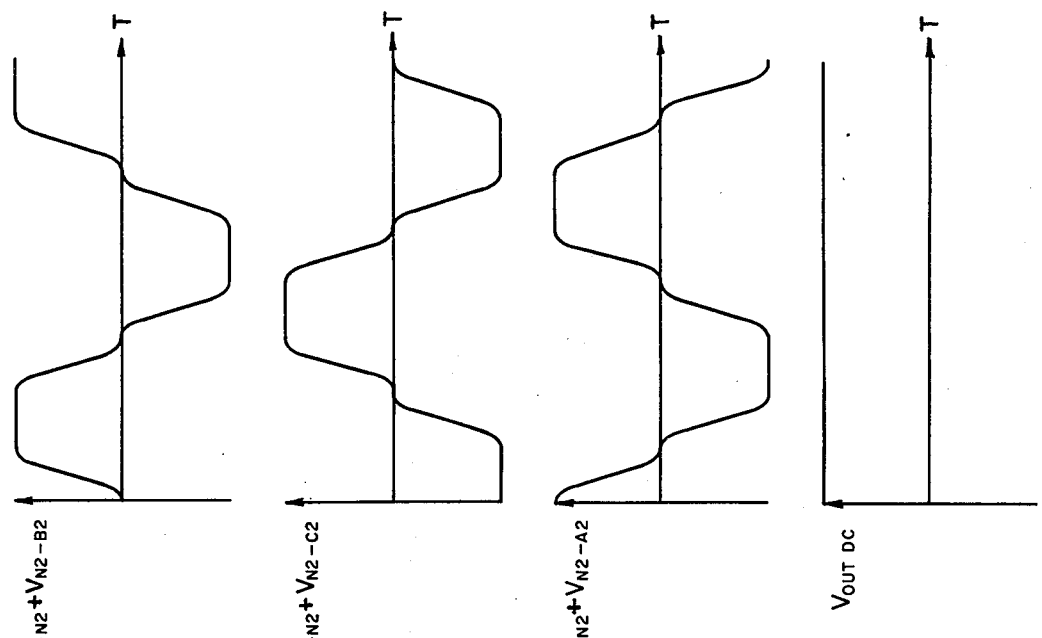

Referring to FIG. 6a, there is shown voltage $V_{A2-B2}$, the voltage from a-c output terminal A2 to a-c output terminal B2. Because of the Y-configuration of windings 1SA, 1SB and 1SC, this voltage is equal to the sum of the voltage from terminal A2 to terminal N2 and the voltage from terminal N2 to terminal B2. Stated differently, voltage $V_{A2-B2}$ is equal to the voltage from terminal A2 to terminal N2 minus the voltage from terminal B2 to terminal N2. The fact that the two last-named voltages combine to establish the flat-topped waveform shown in FIG. 6a may be verified by adding the voltages shown in FIGS. 6b and 6c. It will be understood that the waveforms of voltages $V_{B2-C2}$ and $V_{C2-A2}$ are of similar waveshape, but lag voltage $V_{A2-B2}$ by 120° and 240°, respectively, as shown in FIG. 7. Thus, the coupling of delta-connected secondary windings 2SA, 2SB and 2SC and Y-connected secondary windings 1SA, 1SB and 1SC causes the waveforms of voltages at a-c terminals A2, B2 and C2 to be different from the waveforms of the voltages at a-c terminals A3, B3 and C3.

Referring to FIG. 7, it will be seen that, ideally speaking, at least one of the three flat-topped voltages at terminals B2, A2 and C2 is at its peak value at all times. Because of this fact, and because rectifying network 21 is full-wave rectifier network, the regulated a-c voltages at terminals A2, B2 and C2 produce a regulated d-c voltage upon rectification by network 21. Thus, the d-c output voltage at terminals 11 and 12 has a value substantially equal to the peak value of the regulated a-c voltages at terminals B2, A2 and C2 and is substantially free of ripple.

In practice, the d-c voltage appearing at the output of rectifying network 21 may require filtering before it is applied to a load having stringent ripple limitations. One reason why this filtering may be necessary is that different values of voltage from source 14 and different values of load power cause the waveforms of the voltages across transformer 19 to be distorted somewhat from the shapes shown in FIG. 4. With proper selection of values for components 15 and capacitors CA, CB and CC, however, the effect of this distortion can be eliminated with only light output voltage filtering.

OUTPUT VOLTAGE REGULATION

The start-up and voltage regulating activity of the circuit of FIG. 1 will now be described. As voltage is initially applied to a-c input terminals A, B and C, a-c transient voltages and currents begin to appear across and through the windings of inductor 15 and, through transformer 19, across and through capacitors CA, CB and CC. Assuming that thyristors SA1 through SC2 are initially non-conducting, the voltages at terminals A1, B1 and C1 will rise toward the steady-state a-c values which they would attain if the last named thyristors remained non-conducting. Ordinarily, these steady-state voltages will be higher than those necessary to furnish the desired output voltage. This rise to those higher voltages is stopped at the proper output voltage value by the switching activity of thyristors SA1 through SC2, which thyristors cooperate with inductor DL to establish inductive currents that effectively cancel that portion of the capacitive current drawn by capacitors CA, CB and CC which would allow the output voltage to rise to too high a value or, if necessary, to swamp the capacitive currents entirely and pull the input voltage down by the amount necessary to establish the desired output voltage.

More particularly, as the output voltage approaches its final value, thyristors SA1 through SC2 and inductor DL conduct an inductive current which opposes further increases in the magnitudes of the capacitive currents that network 17 draws from source 14, through inductor 15. As a result, the induced voltages across inductor 15 and the voltages at terminals A1, B1 and C1 approach their final values more slowly. It will be understood that as the voltages at terminals A1, B1 and C1 attain the desired values, a condition is attained in which the inductive currents established by the switching activity of thyristors SA1 through SC2 are just sufficient to combine with the capacitive currents through capacitors CA, CB and CC to induce across inductor 15 a voltage having a magnitude and sign equal to the difference between the unregulated input voltages and the desired output voltage. After the latter condition is attained, it is maintained, over a wide range of input voltages and output power levels, by changing the relative magnitudes of the above-mentioned capacitive and inductive currents.

Assume, as an example, that the input voltage is at its nominal value and that source 14 is supplying no load power through inductance 15. Under these conditions, firing signals are applied to network 17 at about the same times that the a-c input voltages cross through zero. As a result, the capacitor voltages will cross through zero approximately 30° later, i.e., later by one-half of a 60° resonant discharge event, as shown in FIGS. 5a and 5b. Because, as shown for a representative pair of voltages in FIGS. 6a and 6b, the transformer winding configuration causes the voltages at terminals A1, B1 and C1 to lead the capacitor voltages by 30°, the zero-crossings of the voltages at terminals A1, B1 and C1 will occur at approximately the same times as the zero-crossings of the voltages at terminals A, B and C. Consequently, the power angle will be approximately equal to zero and no load power will be delivered, although some small power angle may be present to allow source 14 to furnish the operating losses of the circuit of FIG. 1. In addition, in the present embodiment, the turns ratios of transformer 19 are selected so that, under the assumed conditions, the voltages at terminals A1, B1 and C1 are approximately equal to the nominal input voltages at terminals A, B and C.

Since both the input voltages and the voltages at terminals A1, B1 and C1 are equal and are approximately in phase, the difference between the latter voltages will be approximately zero. Under these conditions, network 17 exhibits a relatively high resistance but a negligible reactance, with the result that the induced voltages across inductance 15 are negligible. In other words, the a-c input voltages are pulled neither up nor down by network 17, since the effects of the capacitive and inductive currents drawn by network 17 cancel one another. This condition corresponds to a condition known as resonance in passive inductor-capacitor circuits.

If, under the above conditions, the input voltages should decrease, the voltages at terminals A1, B1 and C1 will also begin to decrease. The latter decrease in voltage will, in turn, cause control network 23 to retard the phase position of the firing signals in relation to the input voltages. During this change in phase position, there occur decreases in the inductive currents which inductor DL of network 17 draws from source 14, through inductance 15. These decreased inductive currents, in turn, cause network 17 to appear capacitive to source 14 and thereby cause positive induced voltages to appear across inductance 15, the latter increase being just sufficient to reflect the difference between the new, lower input voltage and the regulated output voltage. Thus, as the input voltages decrease from their nominal values, the currents through network 17 become capacitive and thereby effective to pull-up the input voltage toward the values desired at terminals A1, B1 and C1.

If, under the above conditions, the input voltages should rise to above their nominal values, the phase position of the firing signals will be advanced in phase in relation to the input voltages. During this change in phase position, there occur increases in the inductive currents which inductor DL of the network 17 draws from source 14, through inductance 15. These increased inductive currents, in turn, cause network 17 to appear inductive to source 14 and thereby cause negative induced voltages to appear across inductance 15, the latter increase being just sufficient to reflect the difference between the new, higher input voltage and the regulated output voltage. Thus, as the input voltages increase from their nominal values, the currents through network 17 become inductive and thereby effective to pullingdown the input voltage toward the values desired at terminals A1, B1 and C1.

It will be understood that it is not essential to the practive of the invention that a condition of "resonance" occur in network 17 for any particular value of input voltage within the allowable range of input voltages. In the copending application of which this application is a continuation-in-part, for example, regulation was afforded even though the reactance of network 17 remained on the capacitive side of resonance for all permitted values of input voltage. It is also possible to afford regulation for all permitted values of input voltage even though the reactance of network 17 remains entirely on the inductive side of resonance. Other cases exist where unequal capacitive and inductive excursions from resonance occur as the input voltage varies over its maximum permitted range. My preferred embodiment, however, contemplates a coincidence between the occurrence of the nominal input voltage and the occurrence of the condition of resonance.

In accordance with the present invention, I have found that, while the capacitive-to-inductive reactance ratio of any of capacitors CA, CB and CC to inductor DL may have a relatively wide range of values and still cause the net impedance of network 17 to exhibit the desired capacitive-inductive excursion, there is an optimum range for this ratio which causes the regulator to exhibit an overall desirable balance of performance characteristics. More particularly, I have found that, when the above ratio (measured at the input frequency) is greater than fifteen to one and less than one hundred and fifty to one, both the ripple characteristic of the output voltage and the dynamic response of the circuitry are optimized. Accordingly, a capacitive-to-inductive reactance ratio of from fifteen to one to one hundred and fifty to one are preferred in practicing the present invention, with a ratio of approximately twenty two to one being particularly desirable.

The operation of the regulator circuit of the invention in the presence of load current flow is similar to that just described in connection with input voltage changes. In the presence of load current flow, however, the change in power angle is greater, since it includes a component which reflects the load power being supplied as well as a component which results from the previously described angular adjustment for input voltage changes. Since the mechanism for the change in power angle in the presence of changes in load power is described in my earlier patent, this mechanism will not be described in detail herein.

In operating with the circuit of FIG. 1, control network 23 generates pairs of firing signals which, under steady-state conditions, are separated from the preceding and following pair of firing signals by 60° of the a-c input voltage. The phase angle between the firing signals as a whole and the a-c input voltages, however, is dependent upon the magnitude of the input voltage and the output current. As the magnitude of the input voltages or the output current change from the above values, the firing signals will assume new phase relationships to the input voltage and thereby restore the output voltage to the desired, regulated value. During this period of phase adjustment, successive sets of firing signals may be separated by more or less than 60° of the input voltage, but this will be true only until the new steady-state phase position is attained. Thereafter, successive sets of firing signals will once again be separated by 60° of the input voltage, but the set of firing signals as a whole will be located in a different phase position with respect to the input voltages. These control characteristics together with other desirable characteristics such as limits on the rate of change of phase angle are advantageously provided by the control circuitry described in my previously mentioned U.S. Pat. No. 3,922,594.

Figure 3:
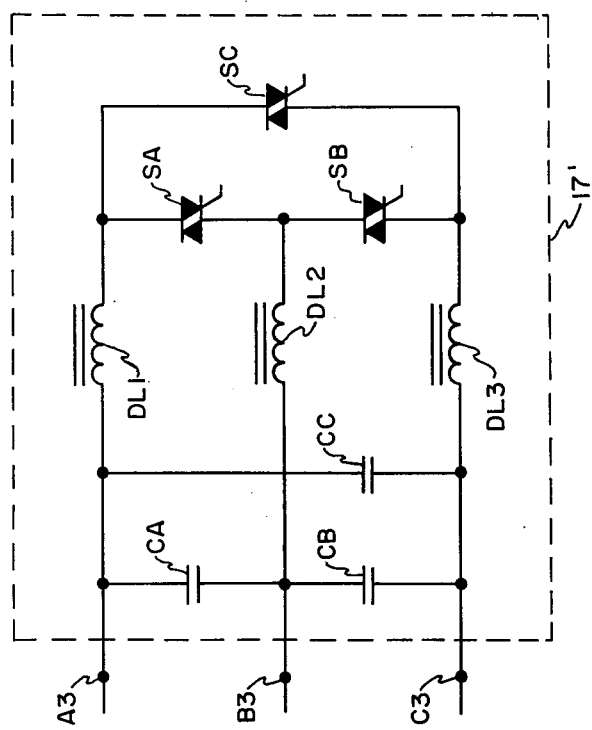
FIG. 3 is a schematic diagram of an alternative embodiment of another portion of the circuit of FIG. 1, and FIGS. 4 through 7 illustrate various exemplary voltage and current waveforms produced by the circuit of FIG. 1.

While the circuit of FIG. 1 illustrates the preferred form of controllable shunt reactance network 17, other forms of inductive switching networks may be utilized in the place thereof. One such alternative network is shown in FIG. 3, wherein substantially equal inductors DL1, DL2 and DL3 serve the function of discharge inductor DL of FIG. 1 and wherein triacs SA, SB and SC serve the function of thyristors SA1 through SC2 of FIG. 1. It should be noted that the triac switching arrangement of FIG. 3 does not provide the rectifying function of the thyristors SA1 through SC2 of the circuit of FIG. 1. The performance of the circuit of FIG. 3 is, however, distinctly inferior to that of the circuit of FIG 1.

In the event that it is desirable to utilize the circuit of the invention in a single phase voltage regulator circuit, this may be accomplished by substituting a single inductor for line inductance 15, by substituting a single phase output voltage rectifier for polyphase rectifier 21. The conrollable shunt reactance 17 need not be changed, however, since there is no necessary relationship between the number of mesh-connected capacitors and the number of input voltage phases. One significant advantage of utilizing three delta-connected capacitors in such a single phase regulator circuit is that the regulator is able to adjust the control angle three times for each half-cycle of the input voltage. This allows the circuitry to respond three times more quickly to changes in input voltage or output current than a circuit of the type shown in the previously identified Manteuffel U.S. Pat. No. 3,076,924.

In view of the foregoing, it will be seen that the circuit of the invention comprises an improved voltage regulator circuit which utilizes novel time and transformer winding relationships to afford improved electrical performance and efficiency while at the same time substantially reducing circuit costs.

It will be understood that the foregoing embodiments of the invention have been shown for illustrative and descriptive purposes only and that the full scope of the present invention is as set forth in the appended claims.

What is claimed is:

1. A voltage regulator circuit comprising, in combination, an a-c input for connection to a source of a-c voltage, an output for connection to a load, first inductance means for supporting a voltage dependent upon the difference between an a-c voltage at the input and a desired voltage at the output, means for connecting the first inductance means between the a-c input and the output, a plurality of capacitors connected to one another in a closed circuit path, the sum of the voltages around said closed circuit path being substantially equal to zero, means for coupling the capacitors to the input through the first inductance means, second inductance means for periodically conducting a resonant discharge current pulse through each capacitor and thereby forcing a redistribution of charge among the then remaining capacitors, controllable switching means for initiating and terminating the flow of the resonant discharge current pulses, means for connecting the controllable switching means between the capacitors and the second inductance means, the resonant discharge frequency of the resonant discharge current pulses being more than three and less than ten times greater than the frequency of the voltage at the input, control means for generating firing signals for the controllable switching means and for varying the phase position of said firing signals, in accordance with the voltage at the output, to cause the combined effective impedance of the capacitors and the second inductance means to have the magnitude and the reactive sign necessary to maintain the desired voltage at the output as the voltage at the input varies over a predetermined permissible range of values.

2. A voltage regulator circuit as set forth in claim 1 wherein the means for connecting the first inductance means to the output includes rectifying means for establishing at the output a d-c voltage the magnitude of which varies in accordance with the magnitudes of the voltages across the capacitors.

3. A voltage regulator circuit as set forth in claim 1 wherein the resonant discharge frequency is no more than six times greater than the frequency of the voltage at the input.

4. A voltage regulator circuit as set forth in claim 1 wherein the controllable switching means comprises a thyristor bridge having a-c terminals connected to the capacitors and having d-c terminals connected to the second inductance means.

5. A voltage regulator circuit as set forth in claim 1 wherein said combined effective impedance varies from capacitive to inductive as the voltage at the input varies from its lowest permissible value to its highest permissible value.

6. A voltage regulator circuit as set forth in claim 2 wherein said combined effective impedance varies from capacitive to inductive as the voltage at the input varies from its lowest permissible value to its highest permissible value.

7. A voltage regulator circuit as set forth in claim 3 wherein said combined effective impedance varies from capacitive to inductive as the voltage at the input varies from its lowest permissible value to its highest permissible value.

8. A voltage regulator circuit as set forth in claim 4 wherein said combined effective impedance varies from capacitive to inductive as the voltage at the input varies from its lowest permissible value to its highest permissible value.

9. A voltage regulator circuit comprising, in combination, a three phase a-c input for connection to a three-phase source of voltage, an output for connection to a load, a series regulating network including line inductance means for supporting voltages dependent upon the difference between a three-phase voltage at the a-c input and a desired voltage at the output, a transformer having a plurality of primary windings and a plurality of secondary windings, means for connecting the line inductance means between the a-c input and the primary windings, means for connecting the secondary windings to the output, a plurality of capacitors connected in a closed circuit path, the sum of the voltages around the closed circuit path being substantially equal to zero, means for coupling the capacitors to the primary windings, discharge inductance means for conducting resonant discharge current pulses through the capacitors, controllable switching means for initiating and terminating the flow of the resonant discharge current pulses and thereby causing periodic redistributions of charge among the capacitors, the resonant discharge frequency of the current pulses being no less than three and no more than ten times greater than the frequency of any phase of the voltage at the a-c input; the capacitors, the discharge inductance means and the controllable switching means together comprising a shunt regulating network that exhibits an impedance having a magnitude and sign dependent upon the times at which firing signals are applied to the controllable switching means; control means for generating firing signals for the controllable switching means, the control means serving to vary the times at which firing signals are applied to the controllable switching means, in accordance with the voltage at the output, so as to maintain the desired voltage at the output.

10. A voltage regulator circuit as set forth in claim 9 including rectifying means for establishing a d-c voltage at the output, the d-c voltage having a magnitude which varies in accordance with the voltages across the capacitors.

11. A voltage regulator circuit as set forth in claim 9 wherein the resonant discharge frequency is less than six times the frequency of any phase of the voltage at the a-c input.

12. A voltage regulator circuit as set forth in claim 11 wherein the primary windings include three Y-connected windings and wherein the secondary windings include a first set of three Y-connected windings connected to the output and a second set of three delta-connected windings connected to the capacitors.

13. A voltage regulator circuit as set forth in claim 9 wherein the controllable switching means comprises a thyristor bridge having a-c terminals connected to the capacitors and having d-c terminals connected to the discharge inductance means.

14. A voltage regulator circuit as set forth in claim 10 wherein the controllable switching means comprises a thyristor bridge having a-c terminals connected to the capacitors and having d-c terminals connected to the discharge inductance means.

15. A voltage regulator circuit comprising, in combination, a polyphase circuit input for connection to a polyphase a-c source, a circuit output for connection to a load, polyphase line inductance means for supporting voltages dependent upon the difference voltages between the a-c voltages at the circuit input and the voltage at the circuit output, a transformer having a set of polyphase primary windings, having a first set of polyphase secondary windings and having a second set of polyphase secondary windings, means for connecting the line inductance means between the circuit input and the primary windings, means for connecting the first set of secondary windings to the circuit output, controllable reactance means for drawing from the circuit input, through the line inductance means and the transformer, currents which vary from capacitive to inductive as the voltages at the circuit input vary from their minimum to their maximum permissible values, means for connecting the controllable reactance means to the second set of secondary windings; said controllable reactance means including a plurality of capacitors connected in a closed circuit path, the sum of the voltages around the closed circuit path being substantially equal to zero, the controllable reactance means also including means for redistributing charge among the capacitors in a predetermined, recurring sequence of discrete charge redistribution events, each charge redistribution event having a maximum duration of from eighteen to sixty degrees of the period of the voltage at the circuit input; and control means for controlling the phase relationships between the voltages across the controllable reactance means and the voltages at the circuit input, in accordance with the voltage at the circuit output, to maintain the voltage at the circuit output at a substantially constant value.

16. A voltage regulator circuit as set forth in claim 15 wherein the primary windings comprise three Y-connected windings, wherein the first set of secondary windings comprise three Y-connected windings and wherein the second set of secondary windings comprise three delta-connected windings.

17. A voltage regulator circuit as set forth in claim 15 wherein each charge redistribution event has a maximum duration of from thirty to sixty degrees of the period of the voltage at the circuit input.

18. A voltage regulator circuit comprising, in combination, a circuit input for connection to a polyphase a-c source, a circuit output for connection to a load, polyphase line inductance means for supporting the difference voltages between a polyphase a-c voltage at the circuit input and a desired voltage at the circuit output, a transformer having a set of polyphase primary windings, having a first set of polyphase secondary windings and having a second set of polyphase secondary windings, means for connecting the first set of secondary windings to the circuit output, at least three capacitors connected to one another in a closed circuit path, the sum of the voltages around said path being substantially equal to zero, means for connecting the capacitors to the second set of secondary windings, controllable discharging means for controllably conducting a recurring sequence of resonant discharge current pulses through the capacitors, each resonant discharge current pulse having a resonant discharge frequency of from three to ten times the frequency of the voltage at the circuit input, and control means for setting the phase relationship between the resonant discharge current pulses and the voltages at the circuit input, in accordance with the voltage at the circuit output, to maintain the desired voltage at the output, said capacitors and said controllable discharging means cooperating, under the control of the control means, to induce across the line inductance means voltages which add to the input voltages when the combined effective impedance thereof is capacitive and which subtract from the input voltages when the combined effective impedance thereof is inductive.

19. A voltage regulator circuit as set forth in claim 18 wherein the primary windings comprise three Y-connected windings, wherein the first set of secondary windings comprise three Y-connected windings and wherein the second set of secondary windings comprise three delta-connected windings.

20. A voltage regulator circuit as set forth in claim 18 wherein each resonant discharge current pulse has a resonant discharge frequency less than six times the frequency of the voltage at the circuit input.

21. A voltage regulator circuit as set forth in claim 18 including rectifying means for establishing at the circuit output a d-c voltage having a magnitude dependent upon the voltages across the capacitors.

22. A voltage regulator circuit comprising, in combination, an a-c input for connection to a source of a-c voltage, an output for connection to a load, first inductance means for supporting a voltage dependent upon the difference between an a-c voltage at the input and a desired voltage at the output, means for connecting the first inductance means between the a-c input and the output, a plurality of capacitors connected to one another in a closed circuit path, the sum of the voltages around said closed circuit path being substantially equal to zero, means for coupling the capacitors to the input through the first inductance means, second inductance means for periodically conducting a resonant discharge current pulse through each capacitor and thereby forcing a redistribution of charge among the then remaining capacitors, controllable switching means for initiating and terminating the flow of the resonant discharge current pulses, means for connecting the controllable switching means between the capacitors and the second inductance means, the resonant discharge frequency of the resonant discharge current pulses being more than three and less than ten times greater than the frequency of the voltage at the input, control means for generating firing signals for the controllable switching means and for varying the phase position of firing signals, in accordance with the voltage at the output, to cause the combined effective impedance of the capacitors and the second inductance means to have the inductive value necessary to maintain the desired voltage at the output as the voltage at the input varies over a predetermined permissible range of values.

23. A voltage regulator circuit as set forth in claim 22 wherein the means for connecting the first inductance means to the output includes rectifying means for establishing at the output a d-c voltage the magnitude of which varies in accordance with the magnitudes of the voltages across the capacitors.

24. A voltage regulator circuit as set forth in claim 22 wherein the resonant discharge frequency is no more than six times greater than the frequency of the voltage at the input.

25. A voltage regulator circuit as set forth in claim 22 wherein the controllable switching means comprises a thyristor bridge having a-c terminals connected to the capacitors and having d-c terminals connected to the second inductance means.

26. A voltage regulator circuit comprising, in combination, a three phase a-c input for connection to a three-phase source of voltage, an output for connection to a load, a series regulating network including line inductance means for supporting voltages dependent upon the difference between a three-phase voltage at the a-c input and a desired voltage at the output, a transformer having a plurality of primary windings and a plurality of secondary windings, means for connecting the line inductance means between the a-c input and the primary windings, means for connecting the secondary windings to the output, a plurality of capacitors connected in a closed circuit path, the sum of the voltages around the closed circuit path being substantially equal to zero, means for coupling the capacitors to the primary windings, discharge inductance means for conducting resonant discharge current pulses through the capacitors, controllable switching means for initiating and terminating the flow of the resonant discharge current pulses and thereby causing periodic redistributions of charge among the capacitors, the resonant discharge frequency of the current pulses being no less than three and no more than ten times greater than the frequency of any phase of the voltage at the a-c input; the capacitors, the discharge inductance means and the controllable switching means together comprising a shunt regulating network that exhibits an inductive reactance having a magnitude dependent upon the times at which firing signals are applied to the controllable switching means; control means for generating firing signals for the controllable switching means, the control means serving to vary the times at which firing signals are applied to the controllable switching means, in accordance with the voltage at the output, so as to maintain the desired voltage at the output.

27. A voltage regulator circuit as set forth in claim 26 including rectifying means for establishing a d-c voltage at the output, the d-c voltage having a magnitude which varies in accordance with the voltages across the capacitors.

28. A voltage regulator circuit as set forth in claim 26 wherein the resonant discharge frequency is less than six times the frequency of any phase of the voltage at the a-c input.

29. A voltage regulator circuit as set forth in claim 28 wherein the primary windings include three Y-connected windings and wherein the secondary windings include a first set of three Y-connected windings connected to the output and a second set of three delta-connected windings connected to the capacitors.

30. A voltage regulator circuit as set forth in claim 26 wherein the controllable switching means comprises a thyristor bridge having a-c terminals connected to the capacitors and having d-c terminals connected to the discharge inductance means.

31. A voltage regulator circuit as set forth in claim 27 wherein the controllable switching means comprises a thyristor bridge having a-c terminals connected to the capacitors and having d-c terminals connected to the discharge inductance means.

32. A voltage regulator circuit comprising, in combination, a circuit input for connection to a polyphase a-c source, a circuit output for connection to a load, polyphase line inductance means for supporting the difference voltages between a polyphase a-c voltage at th circuit input and a desired voltage at the circuit output, a transformer having a set of polyphase primary windings, having a first set of polyphase secondary windings and having a second set of polyphase secondary windings, means for connecting the line inductance means between the circuit input and the primary windings, means for connecting the first set of secondary windings to the circuit output, at least three capacitors connected to one another in a closed circuit path, the sum of the voltages around said path being substantially equal to zero, means for connecting the capacitors to the second set of secondary windings, controllable discharging means for controllably conducting a recurring sequence of resonant discharge current pulses through the capacitors, each resonant dishcharge current pulse having a resonant discharge frequency of from three to ten times the frequency of the voltage at the circuit input, an control means for setting the phase relationship between the resonant discharge current pulses and the voltages at the circuit input, in accordance with the voltage at the circuit output, to maintain the desired voltage at the output, said capacitors and said controllable discharging means cooperating, under the control of the control means, to induce across the line inductance means voltages which pull-down the input voltage to the degree necessary to establish the desired voltage at the output.

33. A voltage regulator circuit as set forth in claim 32 wherein the primary windings comprise three Y-connected windings, wherein the first set of secondary windings comprise three Y-connected windings and wherein the second set of secondary windings comprise three delta-connected windings.

34. A voltage regulator circuit as set forth in claim 32 wherein each resonant discharge current pulse has a resonant discharge frequency less than six times the frequency of the voltage at the circuit input.

35. A voltage regulator circuit as set forth in claim 32 including rectifying means for establishing at the circuit output a d-c voltage having a magnitude dependent upon the voltages across the capacitors.

36. A voltage regulator circuit as set forth in claim 32 wherein the controllable discharging means includes a discharge inductor and a thyristor bridge having a-c terminals connected to the capacitors and d-c terminals connected to the discharge inductor.

* * * * *